(12) United States Patent
Sato et al.

(10) Patent No.: US 6,807,877 B2
(45) Date of Patent: Oct. 26, 2004

(54) ELECTRIC ACTUATOR

(75) Inventors: Toshio Sato, Tsukuba-gun (JP); Shogo Miyazaki, Tsukuba-gun (JP); Akira Tadano, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/880,112

(22) Filed: Jun. 14, 2001

(65) Prior Publication Data

US 2002/0017017 A1 Feb. 14, 2002

(30) Foreign Application Priority Data

Aug. 1, 2000 (JP) ........................................ 2000-233324

(51) Int. Cl.$^7$ .............................................. F16H 29/20
(52) U.S. Cl. ........................ 74/89.37; 74/89.32; 29/563; 409/219
(58) Field of Search ................... 29/565, 567; 409/215; 74/424.94, 424.95, 89.23, 89.37, 89.32; 384/13

(56) References Cited

U.S. PATENT DOCUMENTS

| | | | | |
|---|---|---|---|---|
| 1,446,557 A | * | 2/1923 | Godfriaux | 74/89.32 |
| 2,368,408 A | * | 1/1945 | Brooking | 74/89.32 |
| 4,030,137 A | * | 6/1977 | Dalziel | 74/89.37 |
| 4,199,996 A | * | 4/1980 | Moriwaki et al. | 269/73 |
| 4,442,725 A | * | 4/1984 | Urabe | 74/89.36 |
| 4,517,852 A | * | 5/1985 | Kawakami et al. | 384/13 |
| 4,653,408 A | * | 3/1987 | Nagashima et al. | 108/143 |
| 5,676,019 A | * | 10/1997 | Shenk et al. | 74/424.95 |
| 6,053,065 A | * | 4/2000 | Melzer | 74/424.94 |
| 6,244,122 B1 | * | 6/2001 | Hsu et al. | 74/89.23 |
| 2001/0029797 A1 | * | 10/2001 | Lange et al. | 74/89.37 |

* cited by examiner

Primary Examiner—Erica Cadugan
(74) Attorney, Agent, or Firm—Oblon, Spivak, McClelland, Maier & Neustadt, P.C.

(57) ABSTRACT

A nut member 5 for moving forward and rearward by rotating a feed screw 4 by a stepping motor 28 and a transfer table 7 for transferring a workpiece W are elastically connected by a spring means 24 in transferring of the workpiece to thereby allow the nut member 5 to overrun by flection of the spring means 24, to allow the stepping motor 28 to rotate excessively in a cushioned manner, and to obtain a thrust for pushing the workpiece against an object after the transfer table 7 reaches the transfer end of the workpiece.

9 Claims, 9 Drawing Sheets

ELECTRIC ACTUATOR

TECHNICAL FIELD

The present invention relates to an electric actuator for transferring a workpiece to a working position by a transfer table driven by an electric motor and more specifically to an electric actuator in which a stepping motor driven by pulses is used as a drive source.

PRIOR ART

In this type of electric actuator for transferring various workpieces for processing, assembly, and the like, a stepping motor driven by pulses is used as a drive source in some cases. Because a rotation amount of the stepping motor can be controlled according to the number of drive pulses in stages, the stepping motor can perform an excellent function when it is used for accurately setting a transfer stroke of the workpiece or for accurately stopping the workpiece in place.

However, if the stepping motor becomes overloaded, synchronism between the stepping motor and the drive pulses is not maintained and a so-called phenomenon of loss of synchronism is likely to be caused. Therefore, the stepping motor is not suitable for use which requires a constant thrust in a stopped state such as pushing the workpiece against an object with constant pressure and press-fitting the workpiece into a hole with constant force.

By detecting the rotation amount of the stepping motor, a transfer position of the work, and the like and controlling the stepping motor such that the stepping motor stops immediately before it becomes overloaded, it is possible to prevent loss of synchronism and to apply a thrust to the work in the stopped state. However, an extremely complicated and expensive control circuit is required.

DISCLOSURE OF THE INVENTION

It is an object of the present invention to form an electric actuator for transferring a workpiece by using a stepping motor as a drive source such that loss of synchronism of the stepping motor can be prevented and that a thrust can be applied to the workpiece in the stopped state by providing spring means.

To achieve the above object, an electric actuator of the invention comprises a feed screw in a shape of a straight rod rotatably supported by a bearing member on a base, a nut member connected to the feed screw to reciprocate in an axial direction of the feed screw by normal and reverse rotation of the feed screw, a transfer table connected to the nut member with a degree of freedom in the axial direction of the feed screw to transfer a workpiece by moving to follow the nut member, a stepping motor a rotation amount of which is controlled according to the number of drive pulses, a transmission mechanism for transmitting rotating force of the stepping motor to the feed screw, and spring means disposed between the nut member and the transfer table to elastically connect the transfer table and the nut member when the transfer table transfers the workpiece to thereby allow the nut member to overrun, to allow the stepping motor to excessively rotate in a cushioned manner, and to apply a necessary thrust to the transfer table after the transfer table reaches a transfer end of the workpiece.

In the electric actuator having the above structure, after the transfer table reaches the transfer end of the workpiece, the nut member overruns while flexing the spring means, and as a result, the stepping motor also rotates excessively in a cushioned manner. By setting the number of pulses for driving the stepping motor at a value in a range of the excessive rotation, it is possible to prevent poor synchronism due to loss of synchronism between the stepping motor and the drive pulses. By flection of the spring means, it is possible to apply a thrust necessary at a transfer end to the transfer table.

According to a concrete embodiment of the invention, the base has a sectional groove shape with an open upper face, the feed screw extends axially in a central portion of the groove, the nut member has a short pillar shape and is connected to the feed screw to move in the groove in the base, the transfer table has a sectional groove shape and is disposed on an upper face of the base such that the nut member is covered with the transfer table and that the transfer table can move under a guidance of the base, and a connecting member for connecting the transfer table and the nut member is disposed between the transfer table and the nut member such that the connecting member is engage with one of the transfer table and the nut member with a degree of freedom in the axial direction of the feed screw and is engaged with the other with a degree of freedom in a direction orthogonal to an axis of the feed screw.

In the invention, it is preferable that a linear guide mechanism formed of a plurality of balls which can roll is disposed between opposite side walls of the transfer table and opposite groove walls of the base.

According to another concrete embodiment of the invention, the transfer table has a spring receiver through which the feed screw passes on at least axial one end side of the transfer table and the spring means is disposed between the spring receiver and the nut member.

In the invention, it is possible that measuring means for measuring movements of the transfer table and the nut member with respect to each other at the workpiece transfer end is provided to the transfer table. As a result, it is possible to carry out control in which the stepping motor is stopped in response to a signal from a sensor immediately before loss of synchronism when the elastic force of the spring means is set to be weaker than a thrust with which the stepping motor loses synchronism, for example.

DETAILED DESCRIPTION

Figure 1:
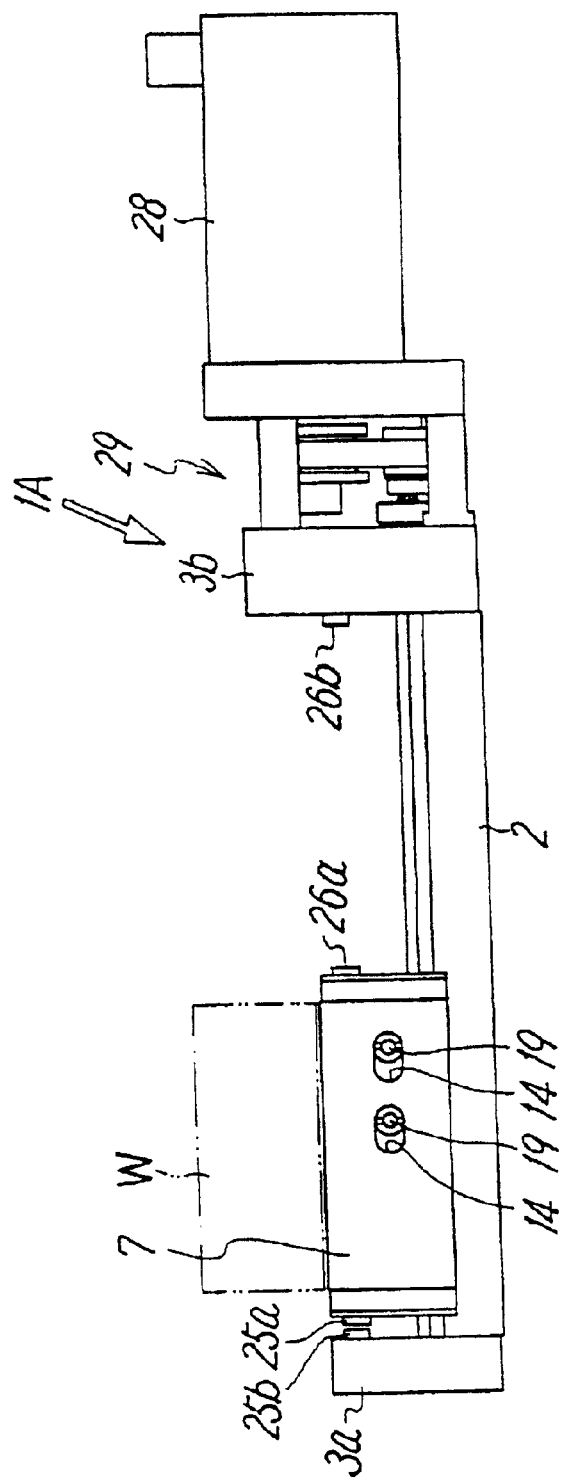
FIG. 1 is a front view of a first embodiment of an electric actuator according to the present invention.

FIGS. 1 to 8 show a first embodiment of an electric actuator according to the present invention. This electric actuator 1A has a base 2 having a sectional groove shape with an open upper face. The base 2 is formed to be thin and long in a groove direction, bearing members 3a and 3b are respectively mounted to axial opposite end portions of the base 2, opposite end portions of a feed screw 4 in a shape of a straight rod extending in an axial direction of the base 2 in a central portion of the groove are respectively and rotatably supported on the bearing members 3a and 3b. The feed screw 4 is formed of a ball screw, a sliding screw, or the like.

A nut member 5 in a substantially circular-cylindrical shape is screwed over the feed screw 4 and reciprocates in an axial direction of the feed screw 4 by normal and reverse rotation of the feed screw 4. A transfer table 7 for retaining and transferring a workpiece W is connected to a nut member 5 through a connecting member 8 disposed between the transfer table 7 and the nut member 5 with a degree of freedom in two direction, i.e., a direction along an axis of the feed screw 4 and a direction orthogonal to the axis. This structure will be described later in detail.

The transfer table 7 has a sectional groove shape with an open lower face and is disposed on an upper face of the base 2 such that the nut member 5 is covered with the transfer table 7 from above and left and right opposite side walls 7a, 7a of the transfer table 7 are fitted with outsides of left and right opposite groove walls 2a, 2a of the base 2. The transfer table 7 can move under a guidance of a linear guide mechanism 10 along the groove walls 2a, 2a. The linear guide mechanism 10 is formed by housing the large number of balls 13 in ball holes 11 formed inside the opposite side walls 7a, 7a of the transfer table 7 and in ball grooves 12 formed between outer faces of the opposite side walls 7a, 7a of the transfer table 7 and outer faces of the opposite groove walls 2a, 2a of the base 2 such that the balls 13 can roll in an endless row as can be seen from FIGS. 4 and 8. In movement of the transfer table 7, these balls 13 circulate between the ball holes 11 and the ball grooves 12 while rolling. Two elongated holes 14 which are long in the axial direction of the feed screw 4 are further provided to each of the left and right opposite side walls 7a, 7a of the transfer table 7.

Figure 6:
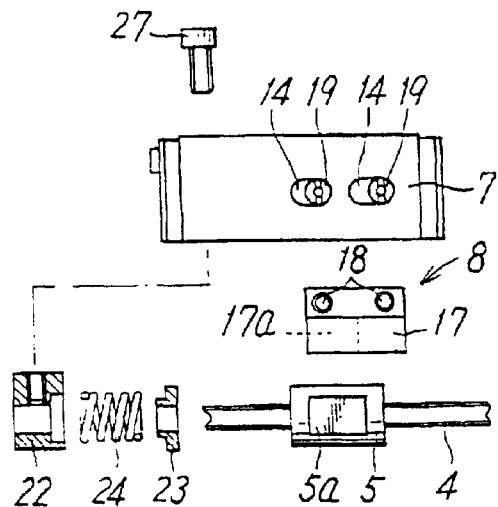
FIG. 6 is a partially cutaway exploded front view of an essential portion in FIG. 3.
Figure 7:
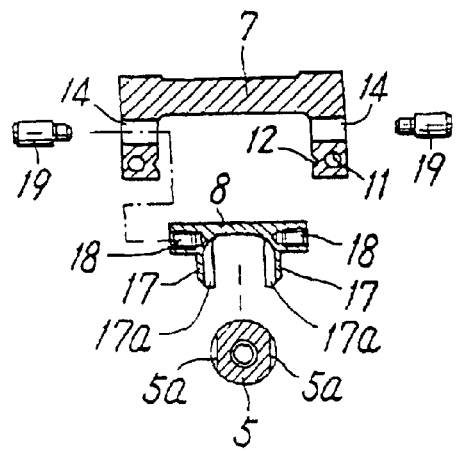
FIG. 7 is a right side sectional view of respective members in FIG. 6.
Figure 8:
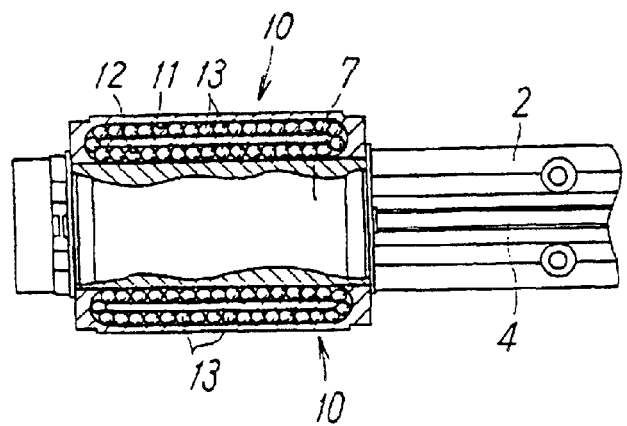
FIG. 8 is a cutaway plan view of an essential portion in FIG. 2.

On the other hand, the connecting member 8 has a pair of left and right connecting walls 17, 17 extending downward to be connected to the nut member 5 and connecting screw holes 18, 18 to be connected to the transfer table 7 and the two connecting screw holes 18 are formed in each of left and right opposite side faces of the connecting member 8 as can be seen from FIGS. 6 and 7. The connecting member 8 and the nut member 5 are connected with a degree of freedom in a vertical direction by fitting the nut member 5 between the pair of connecting walls 17, 17 and fitting projecting portions 17a formed on inner side faces of the respective connecting walls 17, 17 with notch portions 5a formed in to plane shapes on opposite outer side faces of the nut member 5 such that the projecting portions 17a and the notch portions 5a can move with respect to each other in the vertical direction and are locked to each other in the axial direction. By screwing studs 19, 19 down into the screw holes 18, 18 through the elongated holes 14 in the transfer table 7, the transfer table 7 and the connecting member 8 are connected through these studs 19, 19 such that the transfer table 7 and the connecting member 8 can move with respect to each other in the axial direction of the feed screw 4 in a range of a length of the elongated holes 14, 14.

A spring receiver 22 through which the feed screw 4 passes is connected to a front end portion of the transfer table 7 by a screw 27. On the other hand, a circular spring seat 23 is in contact with a front end portion of the nut member 5 and spring means 24 is disposed between the spring receiver 22 and the spring seat 23. Although a coil spring is shown as the spring means 24, the spring means 24 may be a leaf spring, an elastic body such as a sponge body, or means in which compressibility of gas is utilized.

In the drawings, reference numerals 25a and 25b designate stoppers mounted to a front end face of the transfer table 7 and the front bearing member 3a so as to define a forward movement end of the transfer table 7 and reference numerals 26a and 26b designate stoppers mounted to a rear end face of the transfer table 7 and the rear bearing member 3b so as to define a rearward movement end of the transfer table 7.

To a rear end portion of the base 2, a stepping motor 28 a rotation amount of which can be controlled by a drive pulse is mounted as a drive source for driving and rotating the feed screw 4. The stepping motor 28 and the feed crew 4 are connected to each other through a transmission mechanism 29. This transmission mechanism 29 connects pulleys 30a and 30b respectively mounted to an output shaft 28a of the stepping motor 28 and an end portion of the feed screw 4 to each other through a timing belt 31.

Figure 2:
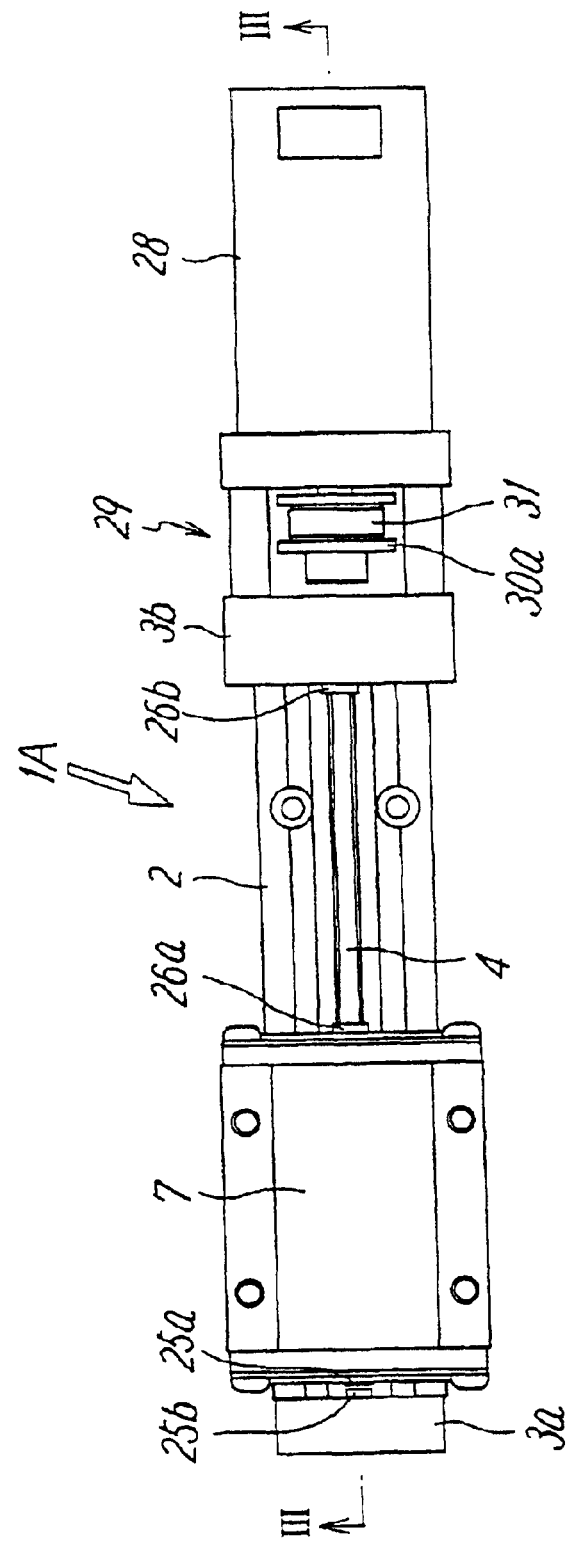
FIG. 2 is a plan view of FIG. 1.
Figure 3:
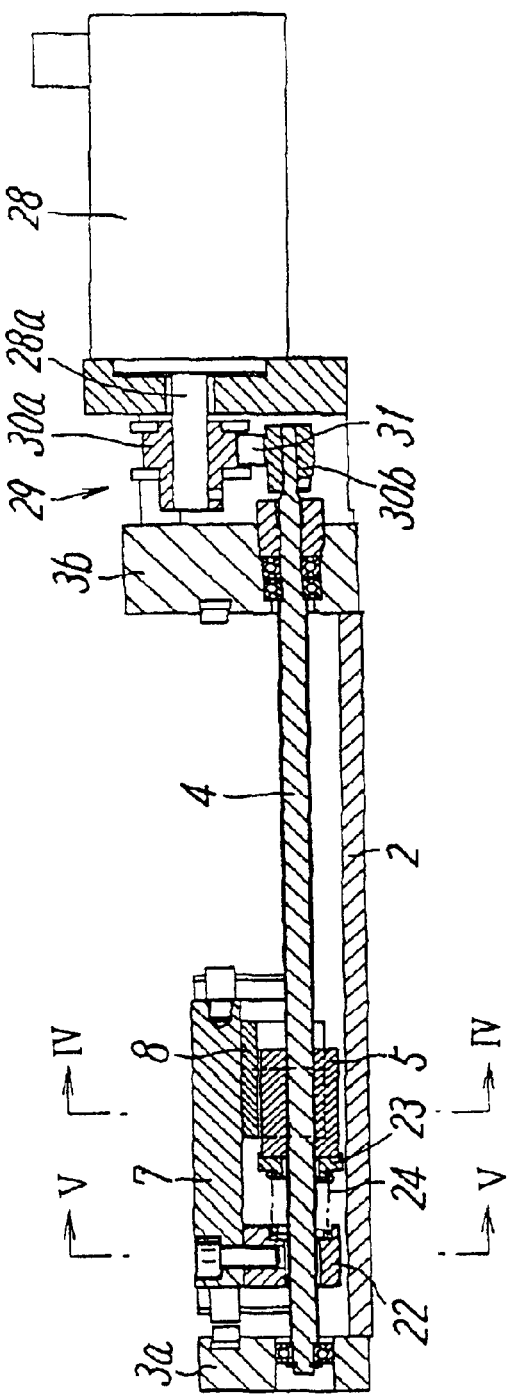
FIG. 3 is a sectional view taken along a line III—III in FIG. 2.
Figure 4:
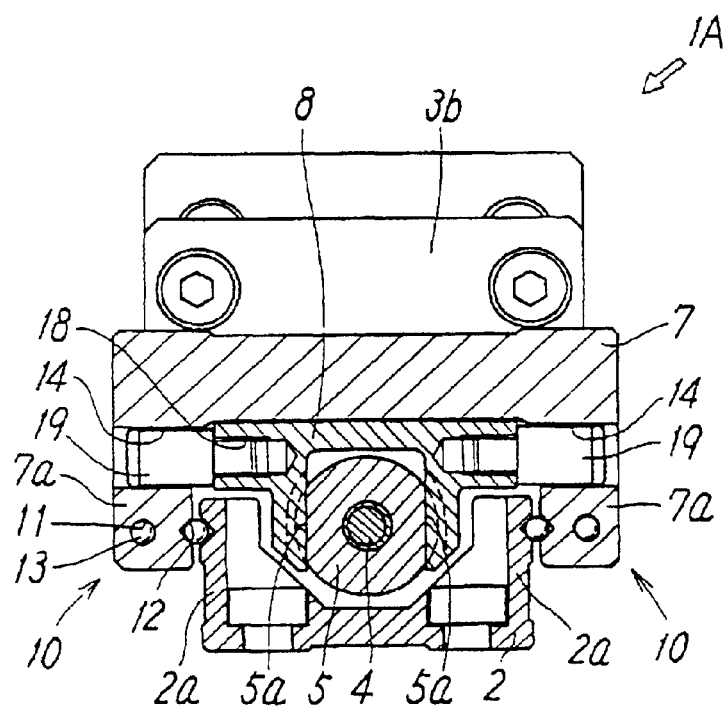
FIG. 4 is a sectional view taken along a line IV—IV in FIG. 3.
Figure 5:
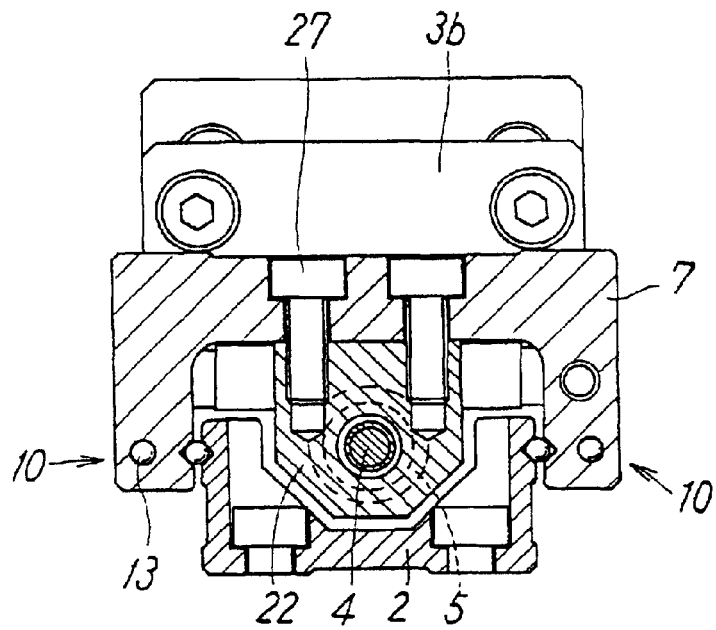
FIG. 5 is a sectional view taken along a line V13 V in FIG. 3.

In the electric actuator 1A having the above structure, when the workpiece W is placed on the transfer table 7 in a state in which the transfer table 7 has moved to an initial position set at the rearward movement end on an opposite side to FIGS. 1 to 3 or an intermediate portion, the stepping motor 28 rotates normally, the nut member 5 moves forward by the normal rotation of the feed screw 4, the transfer table 7 engaged with the nut member 5 through the spring means 24 also moves forward, and the workpiece W is transferred. Then, if the transfer table 7 moves forward to a workpiece transfer end, the workpiece W comes in contact with an object. Therefore, the transfer table 7 stops in the position, the nut member 5 overruns while flexing the spring means 24, and as a result, the stepping motor 28 also rotates excessively in a cushioned manner and stops. At this time, by setting the number of drive pulses at a value in such a range that the stepping motor 28 can rotate excessively and by setting elastic force of the spring means 24 such that the stepping motor 28 does not become overloaded even if the spring means 24 is flexed in the above range, it is possible to prevent poor synchronism due to loss of synchronism between the stepping motor 28 and the drive pulses. Elastic force built up by flection of the spring means 24 can apply a thrust necessary to push the workpiece W against the object at a transfer end to the transfer table 7.

If processing such as assembly and processing of the workpiece W is completed and the workpiece W is removed from the transfer table 7, the feed screw 4 moves reversely by reverse rotation of the stepping motor 28 and the nut member 5 and the transfer table 7 move rearward to the initial position. At this time, the nut member 5 and the transfer table 7 are directly engaged with each other through the connecting member 8, the studs 19, and the elongated holes 14.

Figure 9:
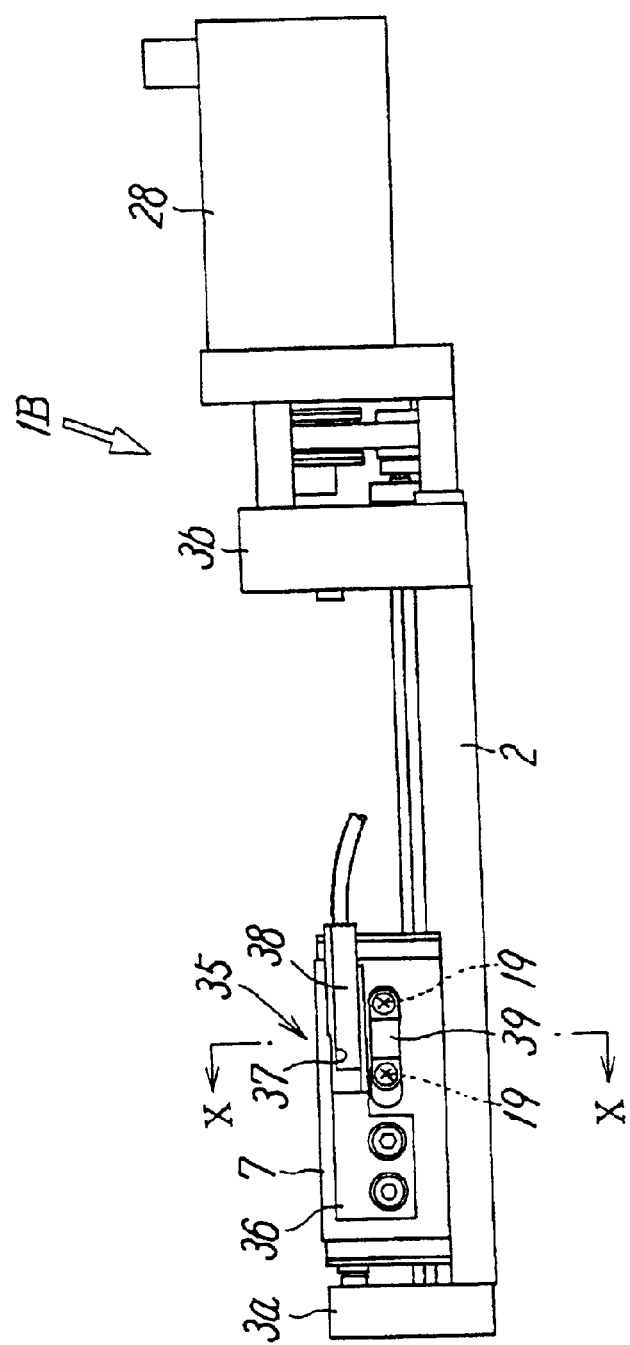
FIG. 9 is a front view of a second embodiment of the electric actuator according to the invention.
Figure 10:
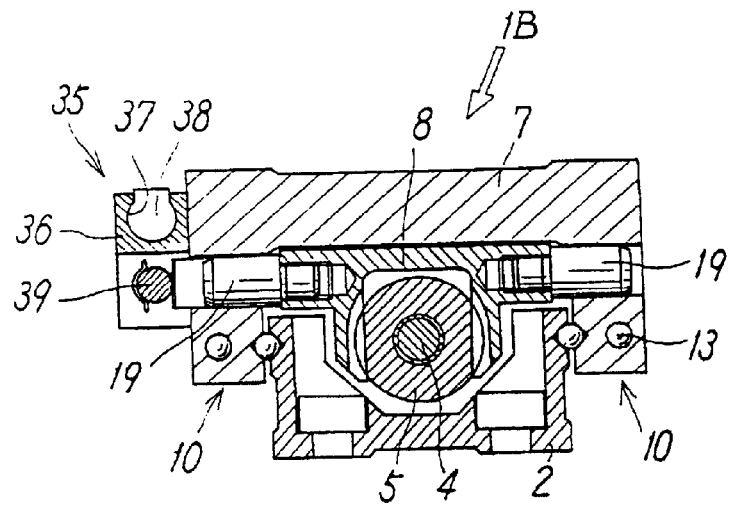
FIG. 10 is a sectional view taken along a line X—X in FIG. 9.

FIGS. 9 and 10 show a second embodiment of the invention. An electric actuator 1B of the second embodiment is different from the first embodiment in that a flexed amount of the spring means 24 is measured by measuring movements of the transfer table 7 and the nut member 5 with respect to each other at the workpiece transfer end by measuring means 35 and that the stepping motor 28 is stopped immediately before the flexed amount of the spring means 24 exceeds a threshold value, i.e., immediately before the stepping motor 28 loses synchronism due to an overload.

In other words, hardware 36 for mounting a sensor is mounted to one side face of the transfer table 7 in this electric actuator 1B and a magnetic sensor 38 such as an automatic switch is fitted in a mounting groove 37 formed in the hardware 36. On the other hand, a permanent magnet 39 is mounted to the two studs 19, 19 on the nut member 5 side. The permanent magnet 39 and the magnetic sensor 38 are disposed in positions close to each other and the measuring means 35 is formed of the permanent magnet 39 and the magnetic sensor 38.

Here, because the studs 19, 19 are fixed to the connecting member 8 and the connecting member 8 is fixed to the nut member 5 in the axial direction of the feed screw 4 while the connecting member 8 is movable with respect to the transfer table 7, it is possible to measure changes in positions of the transfer table 7 and the nut member 5 with respect to each other, i.e., the flexed amount of the spring means 24 by detecting movements of the transfer table 7 and the studs 19, 19 with respect to each other as described above.

In use of such measuring means 35, it is possible to set the elastic force of the spring means 24 to be weaker than the thrust with which the stepping motor 28 loses synchronism.

Because structures and operations of the second embodiment other than those described above are substantially similar to those of the first embodiment, the main similar components are provided with the similar reference numerals to omit description of them so as to avoid repetition of description.

The measuring means 35 is not limited to one formed of the permanent magnet 39 and the magnetic sensor 38 as described above but may be one formed of a magnetic scale formed by disposing magnetic portions and non-magnetic portions at constant intervals and a magnetic sensor for reading a scale of the magnetic scale. In this case, which of the magnetic scale and the magnetic sensor is mounted to the transfer table 7 or the nut member 5 may be arbitrarily determined.

FIGS. 11 to 15 show a third embodiment of the invention. An electric actuator 1C of the third embodiment is different from the above first embodiment in that the nut member 5 and the transfer table 7 are elastically connected by respective spring means 24a and 24b in both strokes of forward and rearward movements by respectively providing the spring means 24a and 24b between front end portions and between rear end portions of the nut member 5 and the transfer table 7 in the third embodiment while the nut member 5 and the transfer table 7 are elastically connected by the spring means 24 only in the forward movement stroke by providing the one spring means 24 between the front end portion of the nut member 5 and the front end portion of the transfer table 7 in the first embodiment.

Figure 12:
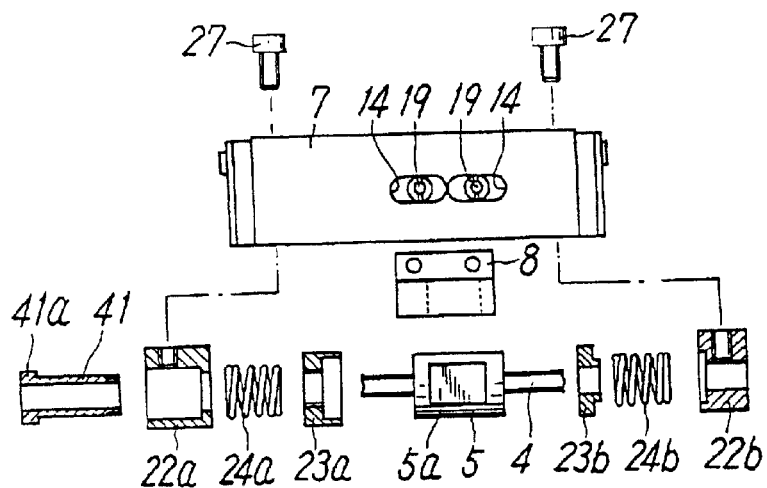
FIG. 12 is a partially cutaway exploded front view of an essential portion in FIG. 11.
Figure 11:
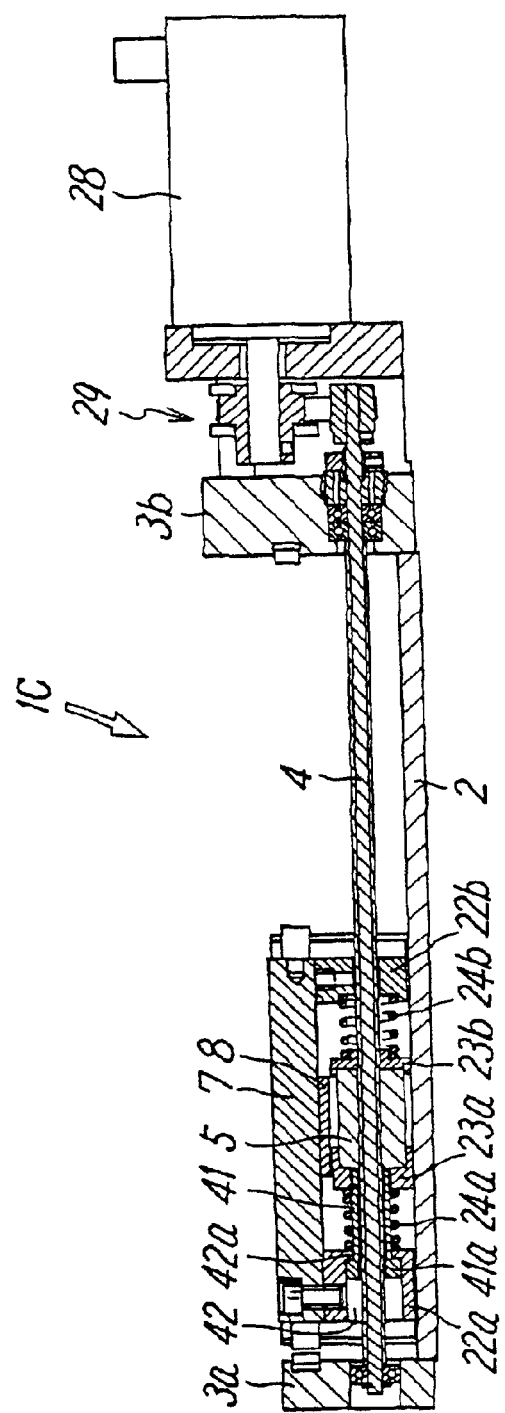
FIG. 11 is a sectional view of a third embodiment of the electric actuator according to the invention.
Figure 15:
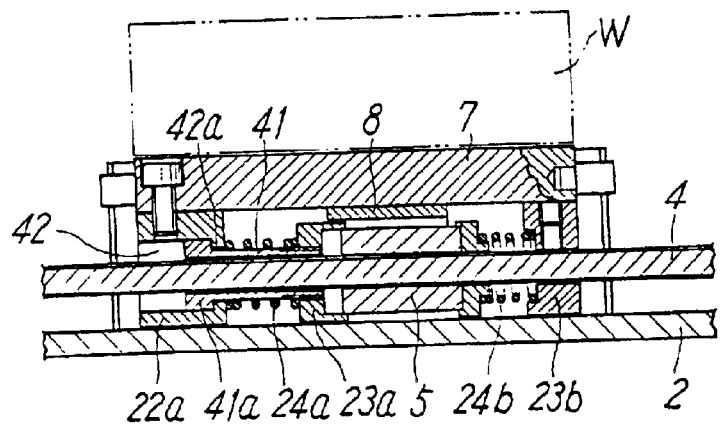
FIG. 15 is a sectional view at a workpiece transfer end on a rearward movement side for explaining operation of the third embodiment.

In other words, as shown in FIGS. 11 and 12, spring receivers 22a and 22b through which the feed screw 4 pass are respectively connected to the front and rear opposite end portions of the transfer table 7, annular spring seats 23a and 23b are disposed at the front and rear opposite end portions of the nut member 5 such that the spring seats 23a and 23b can come in contact with and separate from the nut member 5, and the spring means 24a and 24b are respectively disposed between the respective spring receivers 22a and 22b and the spring seats 23a and 23b. A base end portion of a sleeve 41 for restricting a separating distance between the spring seat 23a and the spring receiver 22a (i.e., an expanding length of the spring means 24a) is screwed to the front spring seat 23a, a tip end of the sleeve 41 is fitted for sliding in a screw insertion hole 42 inside the spring receiver 22a, a flange-shaped locking portion 41a is formed at the tip end of the sleeve 41, and a small-diameter portion 42a to which the locking portion 41a is locked is formed at an end portion of the screw insertion hole 42. As shown in FIG. 15, when the spring seat 23a separates from the spring receiver 22a by a maximum distance, the locking portion 41a at the tip end of the sleeve 41 is locked to the small-diameter portion 42a of the screw insertion hole 42 and further separating is restricted. There is such a relationship between the two spring means 24a and 24b that the front spring means 24a has larger elastic force than the rear spring means 24b.

Because structures of the third embodiment other than those described above are substantially similar to those of the first embodiment, the main similar components are provided with the similar reference numerals to omit description of them.

Figure 13:
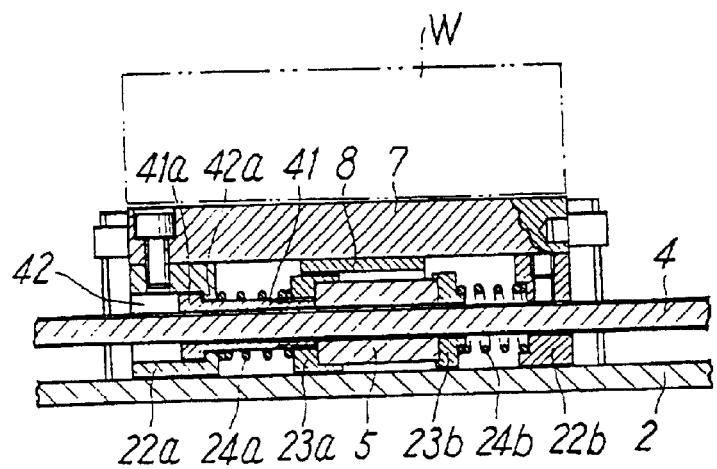
FIG. 13 is a sectional view of an essential portion of an initial state for explaining operation of the third embodiment.

In the electric actuator 1C of the third embodiment having the above structure, the transfer table 7 is in an intermediate initial position shown in FIG. 13 in a non-operating state. At this time, because the locking portion 41a at the tip end of the sleeve 41 is locked to the small-diameter portion 42a of the screw insertion hole 42, the front spring seat 23a and the spring receiver 22a are separated from each other by the maximum distance. On the other hand, the rear spring means 24b is in a slightly compressed state.

Figure 14:
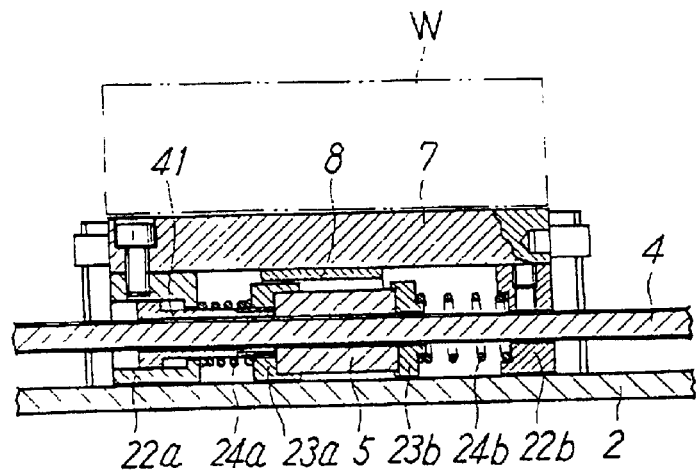
FIG. 14 is a sectional view at a workpiece transfer end on a forward movement side for explaining operation of the third embodiment.

If the workpiece W is placed on the transfer table 7 in this state and the stepping motor 28 rotates normally, the nut member 5 moves forward by normal rotation of the feed screw 4, the transfer table 7 is engaged with the nut member 5 through the front spring means 24a to thereby move forward, and the workpiece W is transferred. Then, if the transfer table 7 moves forward to the transfer end of the workpiece W as shown in FIG. 14, the workpiece W comes in contact with the object. Therefore, the transfer table 7 stops in the position, the nut member 5 overruns while flexing the front spring means 24a, and as a result, the stepping motor 28 also rotates excessively and stops in a cushioned manner. At this time, by setting the number of drive pulses at a value in such a range that the stepping motor 28 can rotate excessively and by setting elastic force of the spring means 24a such that the stepping motor 28 does not become overloaded even if the spring means 24a is flexed in the above range similarly to the first embodiment, it is possible to prevent poor synchronism due to loss of synchronism between the stepping motor 28 and the drive pulses. Elastic force built up by flection of the spring means 24a can apply a thrust necessary to push the workpiece W against the object at the transfer end of the workpiece W to the transfer table 7.

If processing such as assembly and processing of the workpiece W is completed and the workpiece W is removed from the transfer table 7, the feed screw 4 moves reversely by reverse rotation of the stepping motor 28 and the nut member 5 and the transfer table 7 move rearward to the initial position.

If the stepping motor 28 rotates reversely after the workpiece W is placed on the transfer table 7 in the initial position, the nut member 5 moves rearward by reverse rotation of the feed screw 4, the transfer table 7 is engaged with the nut member 5 through the rear spring means 24b to thereby move rearward, and the workpiece W is transferred reversely. Then, if the transfer table 7 moves to the transfer end in a direction of the rearward movement as shown in FIG. 15, the workpiece W comes in contact with the object. Therefore, the transfer table 7 stops at the position, the nut member 5 overruns while flexing the rear spring means 24b, and as a result, the stepping motor 28 also rotates excessively and stops in a cushioned manner. At this time, because movement of the spring seat 23a is restricted by the sleeve 41, the front spring means 24a does not expand further than the initial state. Therefore, the front spring means 24a does not affect in the rearward movement stroke. Thus, at the rearward movement stroke end, it is also possible to prevent poor synchronism due to loss of synchronism of the stepping motor 28 similarly to the case of the forward movement stroke end and it is possible to obtain the thrust necessary to push the workpiece W against the object by flection of the spring means 24b.

In the third embodiment, by measuring movements of the transfer table 7 and the nut member 5 with respect to each other at at least one of the forward and rearward transfer stroke ends, the stepping motor 28 can be stopped immediately before the stepping motor 28 loses synchronism due to the overload similarly to the second embodiment.

Although the connecting member 8 for connecting the transfer table 7 and the nut member 5 is engaged with the transfer table 7 with a degree of freedom in the axial direction of the feed screw 4 and is engaged with the nut member 5 with a degree of freedom in the direction orthogonal to the axis of the feed screw 4 in the above respective embodiments, it is also possible that the connecting member 8 is engaged with the nut member 5 with a degree of freedom in the axial direction of the feed screw 4 and is engaged with the transfer table 7 with a degree of freedom in the direction orthogonal to the axis of the feed screw 4 on the contrary.

As described above, according to the invention, by providing the spring means to the electric actuator for transferring the workpiece by using the stepping motor as the drive source, it is possible to prevent loss of synchronism of the stepping motor and to apply the thrust to the workpiece W in the stopped state.

What is claimed is:

1. An electric actuator comprising a feed screw in a shape of a straight rod rotatably supported by a bearing member on a base,
   a nut member screwed to said feed screw to reciprocate in an axial direction of said feed screw by normal and reverse rotation of said feed screw,
   a transfer table connected to said nut member with a degree of freedom in said axial direction of said feed screw to transfer a workpiece by moving to follow said nut member,
   a stepping motor a rotation amount of which can be controlled according to the number of drive pulses,
   a transmission mechanism for transmitting rotating force of said stepping motor to said feed screw, and
   spring means disposed between said nut member and said transfer table to elastically connect said transfer table and said nut member when said transfer table transfers said workpiece to thereby allow said nut member to overrun, to allow said stepping motor to excessively rotate in a cushioned manner, and to apply a necessary thrust to said transfer table after said transfer table reaches a transfer end of said workpiece;
   wherein the spring means couples the transfer table and the nut member in order to displace the transfer table and the nut member relatively in an axial direction of the feed screw; said base has a sectional groove shave with an open upper face, said feed screw extends axially in a central portion of said groove, said nut member has a short pillar shave and is connected to said feed screw to move in said groove in said base, said transfer table has a sectional groove shape and is disposed on an upper face of said base such that said nut member is covered with said transfer table and that said transfer table can move under a guidance of said base, and a connecting member for connecting said transfer table and said nut member is disposed between said transfer table and said nut member such that said connecting member is engaged with one of said transfer table and said nut member with a degree of freedom in said axial direction of said feed screw and is engaged with the other with a degree of freedom in a direction orthogonal to an axis of said feed screw.

2. An electric actuator according to claim 1, wherein said connecting member and said transfer table are engaged with each other by elongated holes formed in left and right opposite side walls of said transfer table and studs screwed to said connecting member through said elongated holes with a degree of freedom in a range of a length of said elongated holes and in said axial direction of said feed screw and said connecting member and said nut member are engaged with each other by notch portions formed on opposite side faces of said nut member and projecting portions formed on left and right connecting walls of said connecting member to be fitted with said notch portions with a degree of freedom in said direction orthogonal to said axis of said feed screw.

3. An electric actuator according to claim 1, wherein a linear guide mechanism formed of a plurality of balls which can roll is disposed between opposite side walls of said transfer table and opposite groove walls of said base.

4. An electric actuator according to claim 1, wherein said transfer table has a spring receiver through which said feed screw passes on an axial front end portion side of said transfer table and said spring means is disposed between said spring receiver and a spring seat at a tip end of said nut member to thereby elastically connect said transfer table and said nut member in forward movement of said transfer table.

5. An electric actuator according to claim 1, wherein said transfer table has a spring receiver through which said feed screw passes on an axial front end portion side of said transfer table and said spring means is disposed between said spring receiver and a spring seat at a tip end of said nut member to thereby elastically connect said transfer table and said nut member in forward movement of said transfer table.

6. An electric actuator according to claim 1, wherein said transfer table has spring receivers through which said feed screw passes at axial front and rear end portions of said transfer table and said spring means are respectively disposed between said spring receivers and spring seats at front and rear opposite ends of said nut member to thereby elastically connect said transfer table and said nut member in both forward movement and rearward movement of said transfer table.

7. An electric actuator according to claim 6, wherein said spring seat on said front end side of said nut member can come in contact with and is separate from said nut member, and a maximum separating distance of said spring seat from said spring receiver in rearward movement of said nut member is defined, and means for defining said maximum separating distance is a sleeve extending from said spring seat toward said spring receiver and locked to said spring receiver at a rearward movement end of said spring seat.

8. An electric actuator according to claim 1, wherein measuring means for measuring movements of said transfer table and said nut member with respect to each other at said workpiece transfer end is provided to said transfer table.

9. An electric actuator comprising a feed screw in a shape of a straight rod rotatably supported by a bearing member on a base,

- a nut member screwed to said feed screw to reciprocate in an axial direction of said feed screw by normal and reverse rotation of said feed screw,
- a transfer table connected to said nut member with a degree of freedom in said axial direction of said feed screw to transfer a workpiece by moving to follow said nut member,
- a stepping motor a rotation amount of which can be controlled according to the number of drive pulses,
- a transmission mechanism for transmitting rotating force of said stepping motor to said feed screw, and
- spring means disposed between said nut member and said transfer table to elastically connect said transfer table and said nut member when said transfer table transfers said workpiece to thereby allow said nut member to overrun, to allow said stepping motor to excessively rotate in a cushioned manner, and to apply a necessary thrust to said transfer table after said transfer table reaches a transfer end of said workpiece;

wherein the spring means couples the transfer table and the nut member in order to displace the transfer table and the nut member relatively in an axial direction of the feed screw; said transfer table has spring receivers through which said feed screw passes at axial front and rear end portions of said transfer table and said spring means are respectively disposed between said spring receivers and spring seats at front and rear opposite ends of said nut member to thereby elastically connect said transfer table and said nut member in both forward movement and rearward movement of said transfer table; said spring seat on said front end side of said nut member, can come in contact with and is separate from said nut member, and a maximum separating distance of said spring seat from said spring receiver in rearward movement of said nut member is defined, and means for defining said maximum separating distance is a sleeve extending from said spring seat toward said spring receiver and locked to said spring receiver at a rearward movement end of said spring seat.

* * * * *